United States Patent [19]

Braschler

[11] Patent Number: 5,289,905

[45] Date of Patent: Mar. 1, 1994

[54] HYDRODYNAMIC RETARDER FOR LARGE OFF-ROAD ELECTRIC WHEEL DRIVEN VEHICLES

[75] Inventor: Steve A. Braschler, Coffeyville, Kans.

[73] Assignee: Parmac, Inc., Coffeyville, Kans.

[21] Appl. No.: 581,661

[22] Filed: Sep. 13, 1990

[51] Int. Cl.⁵ .............................................. F16D 57/02
[52] U.S. Cl. ..................................... 188/296; 180/65.5
[58] Field of Search ............... 188/296, 290; 180/65.5, 180/65.6, 65.7; 310/76, 77

[56] References Cited

U.S. PATENT DOCUMENTS

| | | | |
|---|---|---|---|
| 2,421,056 | 5/1947 | Dake et al. | 188/296 X |
| 2,990,919 | 4/1961 | Christenson et al. | |
| 3,072,224 | 1/1963 | Woody et al. | |
| 3,103,997 | 9/1963 | Shealy et al. | |
| 3,120,293 | 4/1964 | Spere | |
| 3,185,261 | 5/1965 | Campbell et al. | |
| 3,315,770 | 4/1967 | Wall | |
| 3,451,511 | 6/1969 | Knapp | 188/90 |
| 3,482,659 | 12/1969 | Knapp et al. | 188/90 |
| 3,557,743 | 1/1971 | Rubis | 115/34 |
| 3,640,359 | 2/1972 | Clark et al. | 192/3 R |
| 3,757,909 | 9/1973 | McClure | 188/290 |
| 3,761,196 | 8/1973 | Weinert | 415/119 |
| 3,770,074 | 11/1973 | Sherman | 180/65.6 |
| 3,860,097 | 1/1975 | Braschler et al. | 188/296 |
| 3,877,317 | 4/1975 | Stripling | 74/5.6 |
| 3,892,300 | 7/1975 | Hapeman et al. | 180/65.5 |
| 3,945,473 | 3/1976 | Prather et al. | 188/296 |
| 3,955,654 | 5/1976 | Lemonnier | 188/296 |
| 3,958,671 | 5/1976 | Muller | 188/274 |
| 4,175,647 | 11/1979 | Hanke | 188/274 |
| 4,194,600 | 3/1980 | Armasaw et al. | 188/296 |
| 4,213,332 | 7/1980 | Bonomo et al. | 73/134 |
| 4,215,569 | 8/1980 | Bonomo et al. | 73/134 |
| 4,282,952 | 8/1981 | Bartley | 188/18 |
| 4,321,990 | 3/1982 | Koch, Jr. | 192/13 |
| 4,454,935 | 6/1984 | Pryor | 188/296 |
| 4,475,636 | 1/1984 | Rao | 188/296 |
| 4,538,553 | 8/1985 | Kurz et al. | 123/41.13 |
| 4,799,564 | 1/1989 | Iijima et al. | 180/65.6 X |
| 4,827,798 | 5/1989 | Oldfield | 74/687 |

FOREIGN PATENT DOCUMENTS

| | | | |
|---|---|---|---|
| 162327 | 7/1988 | Japan | 180/65.5 |
| 1243967 | 7/1986 | U.S.S.R. | 180/65.5 |

*Primary Examiner*—Robert J. Oberleitner
*Attorney, Agent, or Firm*—Head & Johnson

[57] ABSTRACT

A wheel assembly for large off-road mining vehicles wherein an electric motor and drive system for each wheel is combined with a hydrodynamic retarder. The hydrodynamic retarder is mounted such that a rotor is directly connected to an electric motor shaft where typically a disc-type parking brake is mounted. This arrangement eliminates any possible mechanical failure of a gear train or other power reduction or increasing device which would otherwise result in the loss of braking.

3 Claims, 6 Drawing Sheets

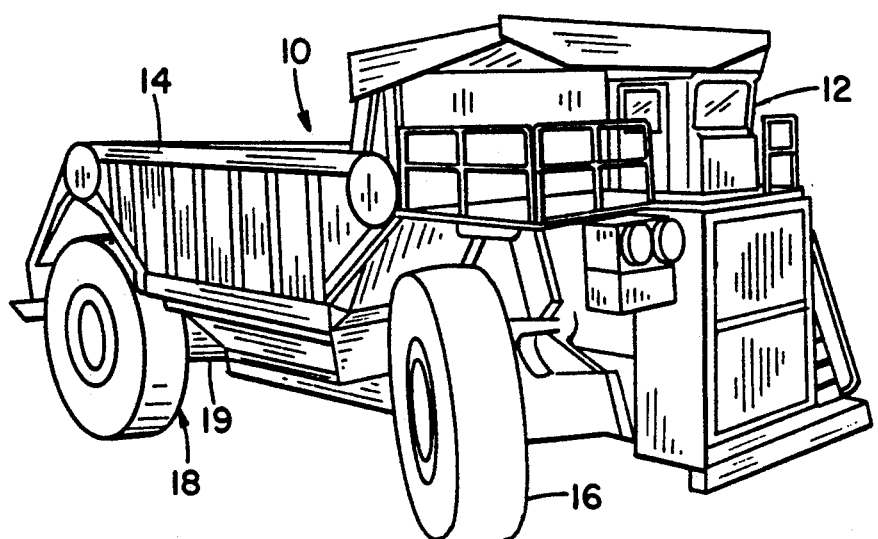
Fig. 1
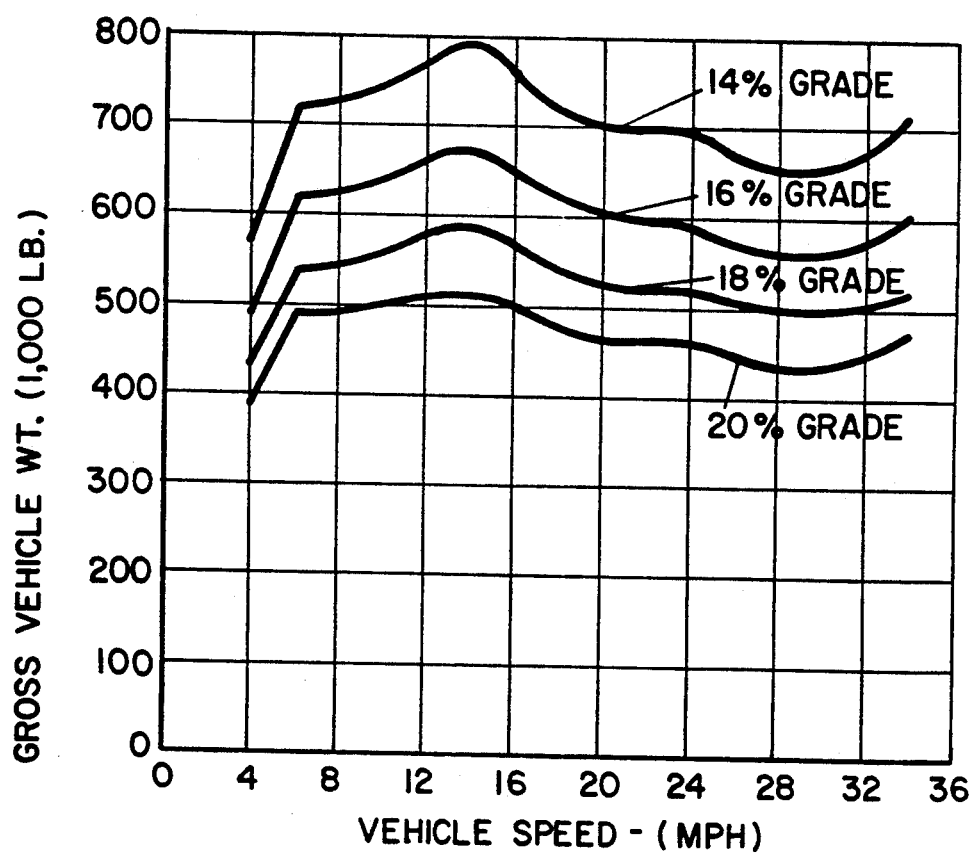
Fig. 10  BRAKING PERFORMANCE – CORRECT RETARDER AND MOTORS

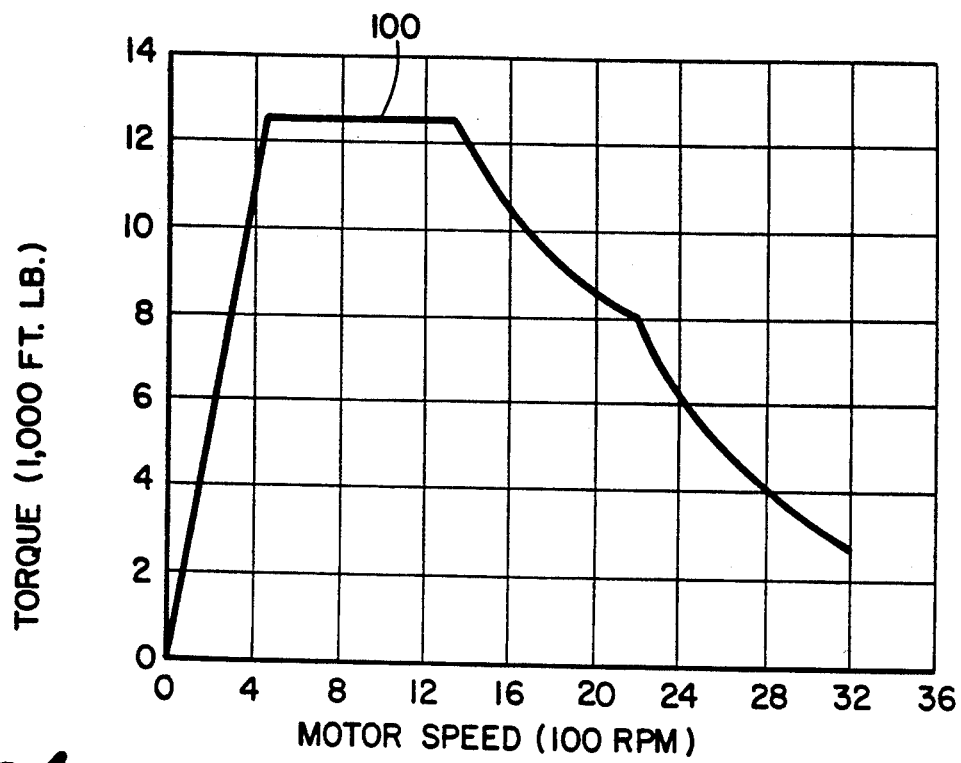
Fig. 4 BRAKING TORQUE - 2 ELECTRIC MOTORS
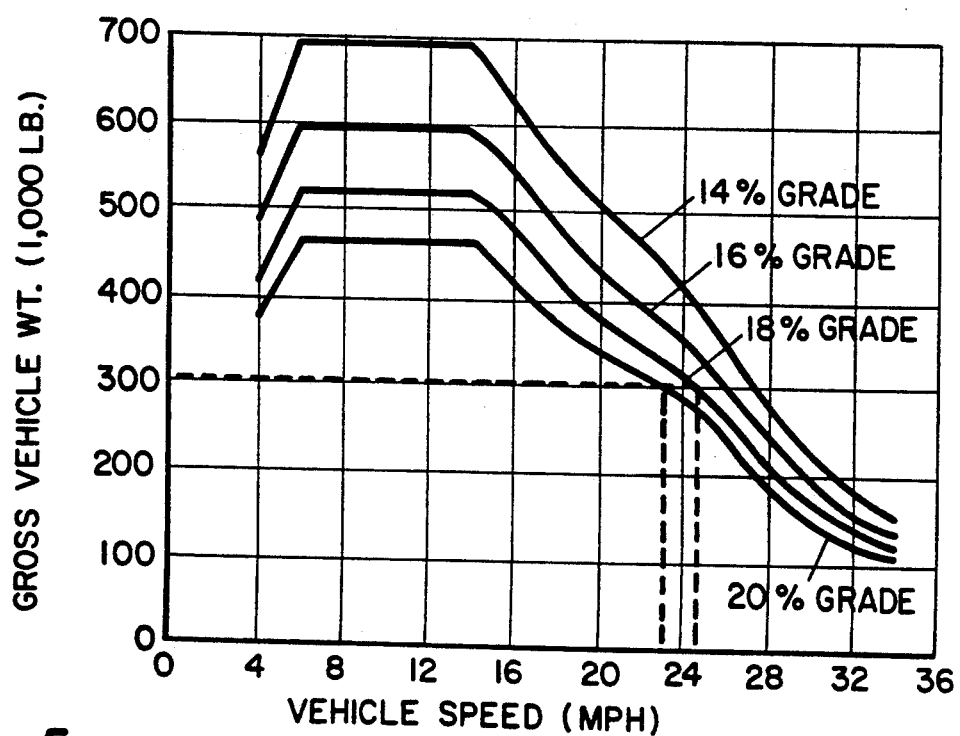
Fig. 5 BRAKING PERFORMANCE - 2 ELECTRIC MOTORS ONLY

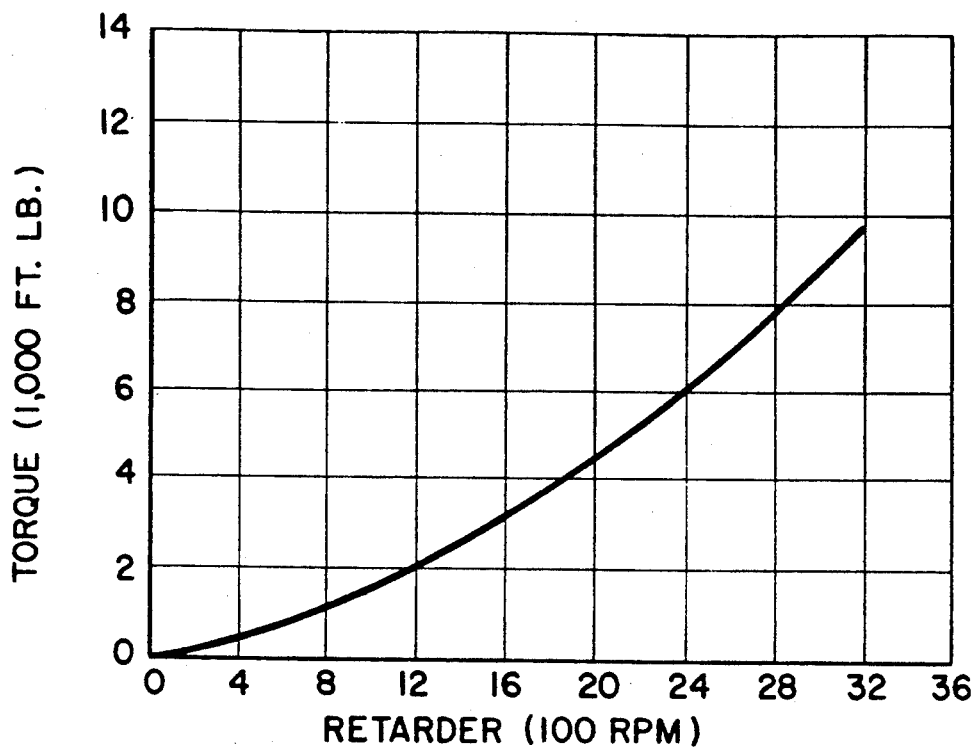
Fig. 6 BRAKING TORQUE - 2 HYDRODYNAMIC RETARDERS
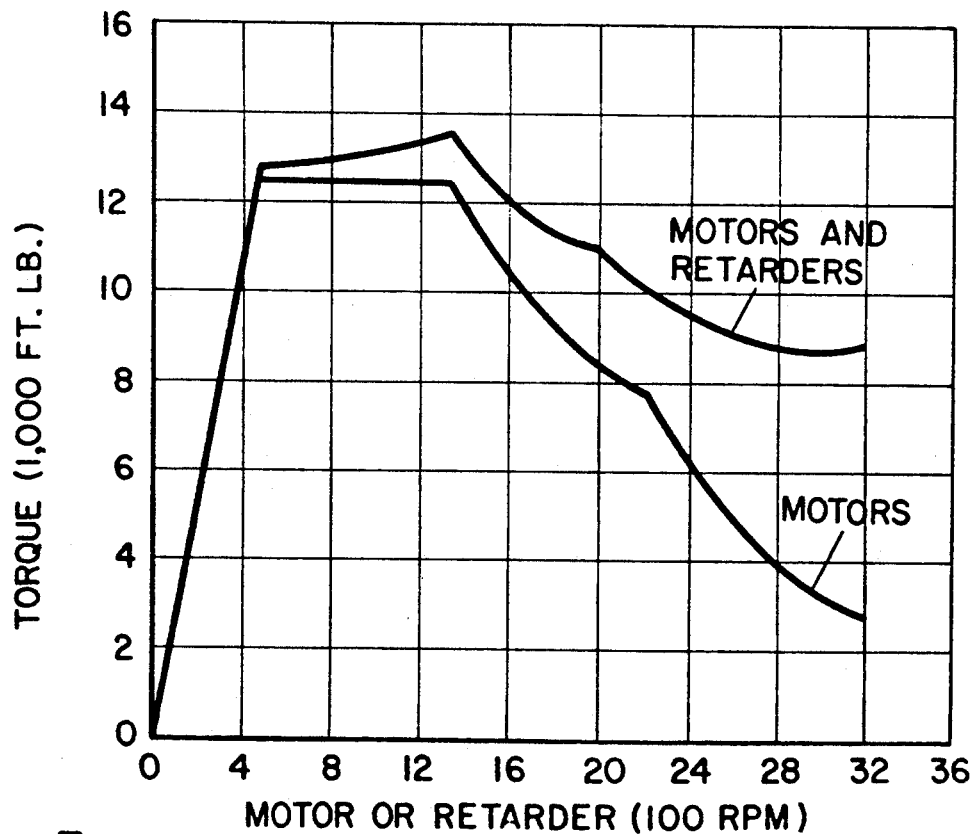
Fig. 7 BRAKING TORQUE - RPM, SMALL RETARDER

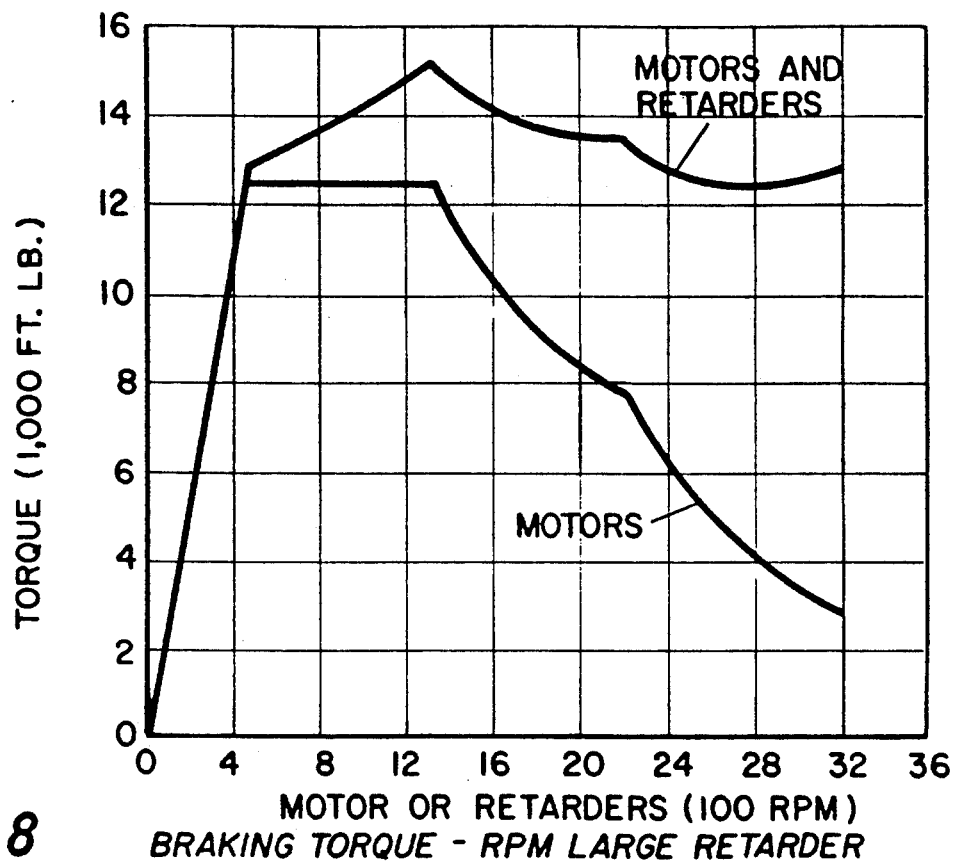
Fig. 8  BRAKING TORQUE - RPM LARGE RETARDER
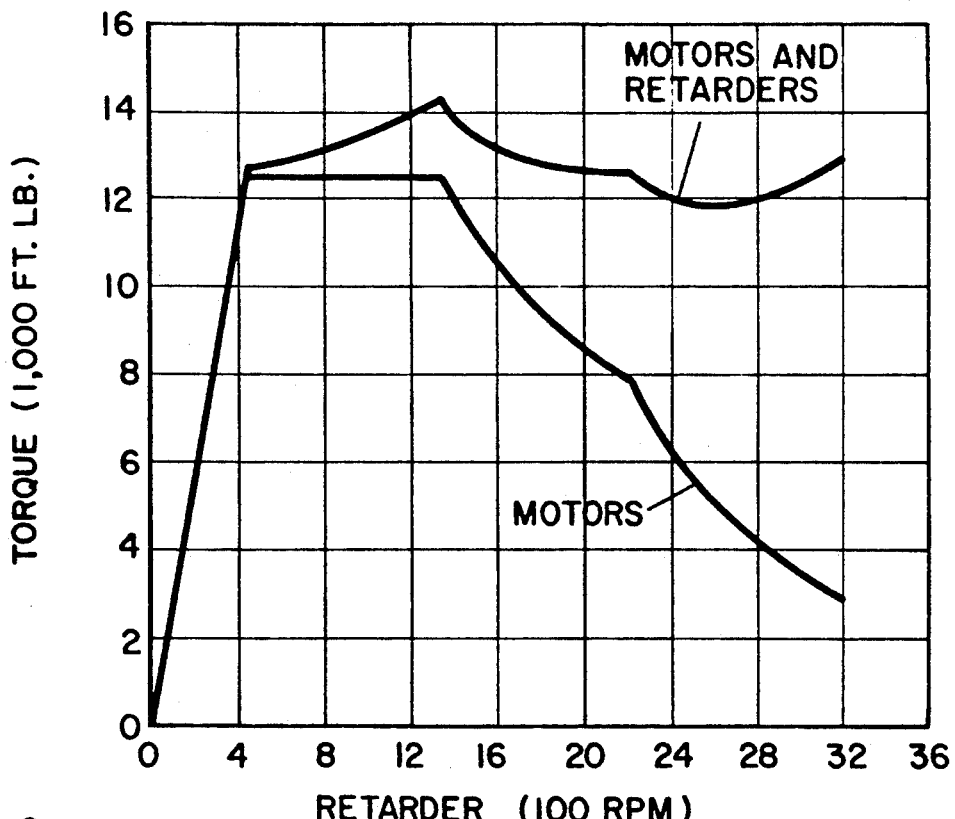
Fig. 9  RETARDER OF CORRECT SIZE AND MOTORS

HYDRODYNAMIC RETARDER FOR LARGE OFF-ROAD ELECTRIC WHEEL DRIVEN VEHICLES

BACKGROUND

This invention relates to improvements in motor vehicles, particularly off-road haulage type vehicles such as large ore dump trucks and the like having very large wheels.

Extremely large off-road vehicles are becoming widely used in many industries, particularly in the mining industry and also in the large construction industry, and the like. The excessive size and weight of these vehicles have created many problems in the construction and operation thereof for both efficiency and safety purposes. The wheels of said vehicles are exceptionally large, usually requiring tires in excess of 10 feet in diameter. The power to such vehicles has generally consisted of an engine, transmission, drive line, differential, and rear axle. Time is of the essence in a typical mining situation. The time, that is, the time a loaded vehicle travels between its loading site to its unloading site, and then its return to the loading site, is critical to efficient use of these large off-road vehicles. Many of the mining operations have steep uphill and downhill grades; and due to the desire for high speed, long haul, and long downhill grades, the usual service brakes of these vehicles have not been adequate to retard the speed. It has been found that during braking operation that a common disc brake system, for example, generates a considerable amount of heat, and the metallic material from which the disc is constructed frequently "seizes" the elements to which it is secured, or fuses thereto, resulting in dangerous situations and expensive down time. Hydrodynamic retarders, i.e. water brakes, have been used on such vehicles to relieve the service brakes of the excessive retarding requirements. Typically, however, the retarder is installed in the drive line of the power transmission system.

In later years, the design of such vehicles has progressed to the use of hydraulic and electrical wheel driven vehicles. As such, an electric or hydraulic motor driving means is located in each rear wheel and through a gear reduction system, the entire mechanical drive between the engine and the wheel was eliminated. By installing an alternator/generator or hydraulic pump on the engine, flexibility between the engine and wheels was obtained by transferring power through electric lines or hydraulic tubing. The electric wheel-driven design eliminated the transmission and drive train normally required. Braking of the vehicle was achieved by switching the electric motor to an electric generator during severe downhill braking requirements. The energy developed by the vehicle descending a steep grade is then converted from mechanical energy to electrical energy by the wheels driving the generator/motor. The generated electrical current is then dissipated as heat in an electrical resistance. The heat generated in the electrical resistance is then transferred to the surrounding air by forced convection, i.e. cooling of the electrical resistance. It has been found that resistance of such an electrical regarding system achieves temperatures of 1200° F. to 1300° F. Since the energy transfer rate is directly in proportion with the temperature differential, the four-fold temperature increase resulted in quadrupling the retarded energy. Although the electrical retarding of vehicles resulted in an advantage of continuous retarding, one disadvantage resulted. DC electric motors used on vehicles have a definite torque-speed relationship, but the same characteristic whether the motor is being used as a power source or as a generator absorbing power or energy. As the speed of the motor increases, the torque developed or absorbed decreases. In order for the torque output as a motor or the torque input as a generator to remain constant, the electrical current must increase with speed. The electrical current must flow through the contact between the brushes and the commutators. As the shaft speed increases, the current must be decreased, to prevent arcing or flashover between the brushes and the commutator. Otherwise, the commutator will be damaged. Due to this mechanical limit of electrical current versus speed, the electric motor-driven type of off-road vehicle has very little retarding torque at high speeds, thus restricting the maximum possible speed of the vehicle. If the operator of such a vehicle exceeds the maximum speed on a grade and uses the backup service brakes to slow the vehicle in order to continue down the grade, should he exceed the maximum speed again, there is no means of stopping the vehicle since the service brakes become hot and will fade or become inoperative. For example, a 300,000 lb. vehicle must not exceed 22.5 miles per hour on a twenty percent (20%) grade or 24.5 miles per hour on an eighteen percent grade.

SUMMARY OF THE INVENTION

This invention results in the concept of off-road vehicle drive wheel design connecting a hydrodynamic retarder to an electric motor drive shaft and/or its transmission system in order that both the electrical retarding concept and the hydrodynamic retarder permit retarding capabilities at higher vehicle speeds.

It is a further object of the invention to provide a hydrodynamic retarder in conjunction with an electric motor wheel-driven off-road vehicle that will result in safer vehicle operation, yet permit higher speeds on downhill grades. As a result, such higher operational speeds will cause shorter round trip times in the earthmoving or mining operation.

It is a further object of the invention to utilize a hydrodynamic brake or retarder in combination with an electric motor wheel-driven off-road vehicle wherein torque decreases with the speed of the motor will provide a constant braking torque throughout the speed range of the vehicle and thus reduce vehicle speed limitations.

The objects of the invention are accomplished by providing a hydrodynamic retarder of diameter to provide the adequate mid-range braking characteristics and of such rotor and stator pocket size and shape to provide adequate but limited capacity at maximum speed when operated full of fluid throughout the entire speed range of the vehicle, and thus provide equal braking performance for the vehicle at all speeds.

Specifically, the invention is directed to a wheel assembly for large off-road vehicles-for instance, vehicles having two separate wheel drives, with an electric motor mounted about the center of rotatable wheel rim and tire assembly. Typically, the output of each electric motor is transferred to a transmission or drive gear reduction system connected to the rotatable wheel rim and tire assembly. A hydrodynamic retarder is to be connected to the input of the transmission gear reduction system to take advantage of the higher rpm. Accordingly, the hydrodynamic retarder is mounted such that the rotor is directly connected to the electric motor shaft where typically a disc-type parking brake is mounted and thus eliminate any possible mechanical failure of the retarder shaft and connector between it and the motor shaft which would otherwise result in loss of braking. Preferably, the motor shaft is directly, sealably, and rotatably connected with the rotor of the retarder.

BRIEF DESCRIPTION OF THE DRAWINGS

FIG. 1 is a frontal perspective view of a typical off-road vehicle of the type with which the hydrodynamic retarder apparatus embodying the invention may be utilized.

FIG. 4 is a graph depicting the relationship of motor speed and torque in a typical electric motor-driven off-road vehicle.

FIG. 5 is a graphic explanation of electric motor torque relative to gross vehicle weight and vehicle speed in a typical prior art electric, wheel driven, off-road vehicle.

FIG. 6 depicts the normal torque/speed relationship for hydrodynamic retarders.

FIG. 7 is a graphic indication of the braking torque of a small hydrodynamic retarder coupled to an electric motor and the braking ability accomplished by both.

FIG. 8 is similar to that of FIG. 7 depicting motor/torque relationship with a larger hydrodynamic retarder.

FIG. 9 is a graphic display of a correctly designed hydrodynamic retarder combined with an electric motor indicating the torque/braking torque.

FIG. 10 is a graphic display of gross vehicle weight versus vehicle speed in a system having correct motor and hydrodynamic retarder as shown in FIG. 9 relative to a variety of downhill grades.

DETAILED DESCRIPTION OF THE PREFERRED EMBODIMENT

Figure 2A:
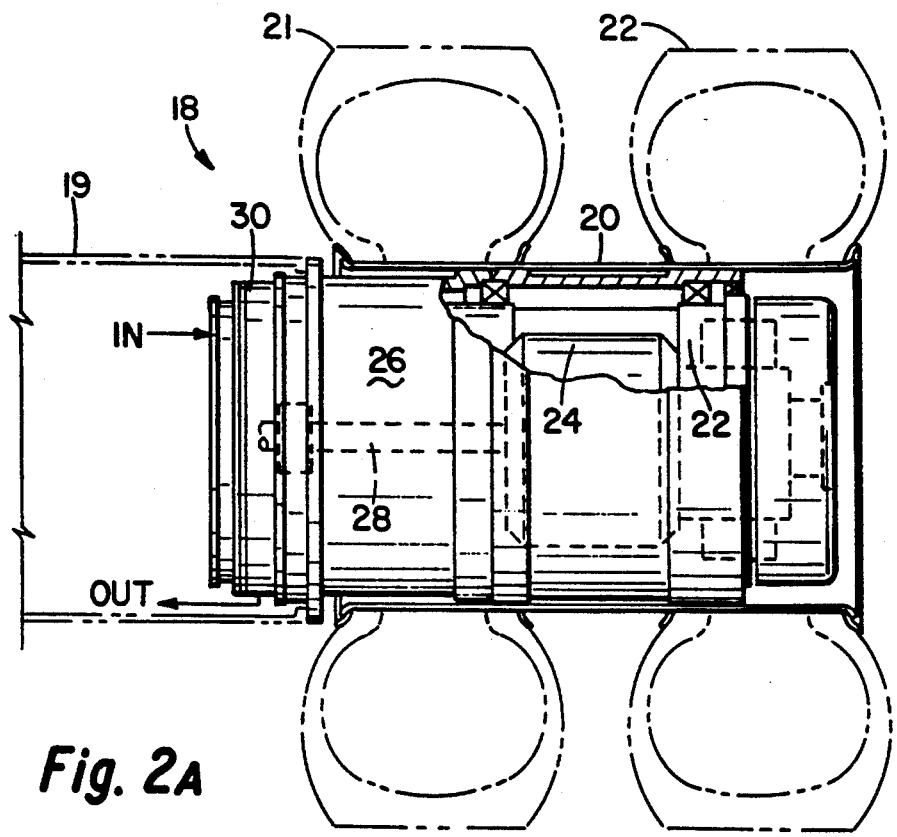
FIGS. 2A and 2B are sectional views of two different types of electric motor-driven wheel rim and tire assemblies incorporating Applicant's invention.

Referring to FIG. 1, reference character 10 generally indicates an off-road vehicle of the type to which this invention is directed. Such a vehicle comprises a cab section 12, a dump body 14, a pair of front wheels 16 which are independently mounted on opposite sides of the cab section 12, in a manner as is well known in the art. A pair of rear wheels 18 are connected or journalled on opposite sides of a common axle 19. In this invention, each of the rear wheels 18 are driven by a suitable electric motor which is best depicted in FIGS. 2A and 2B.

Figure 3:
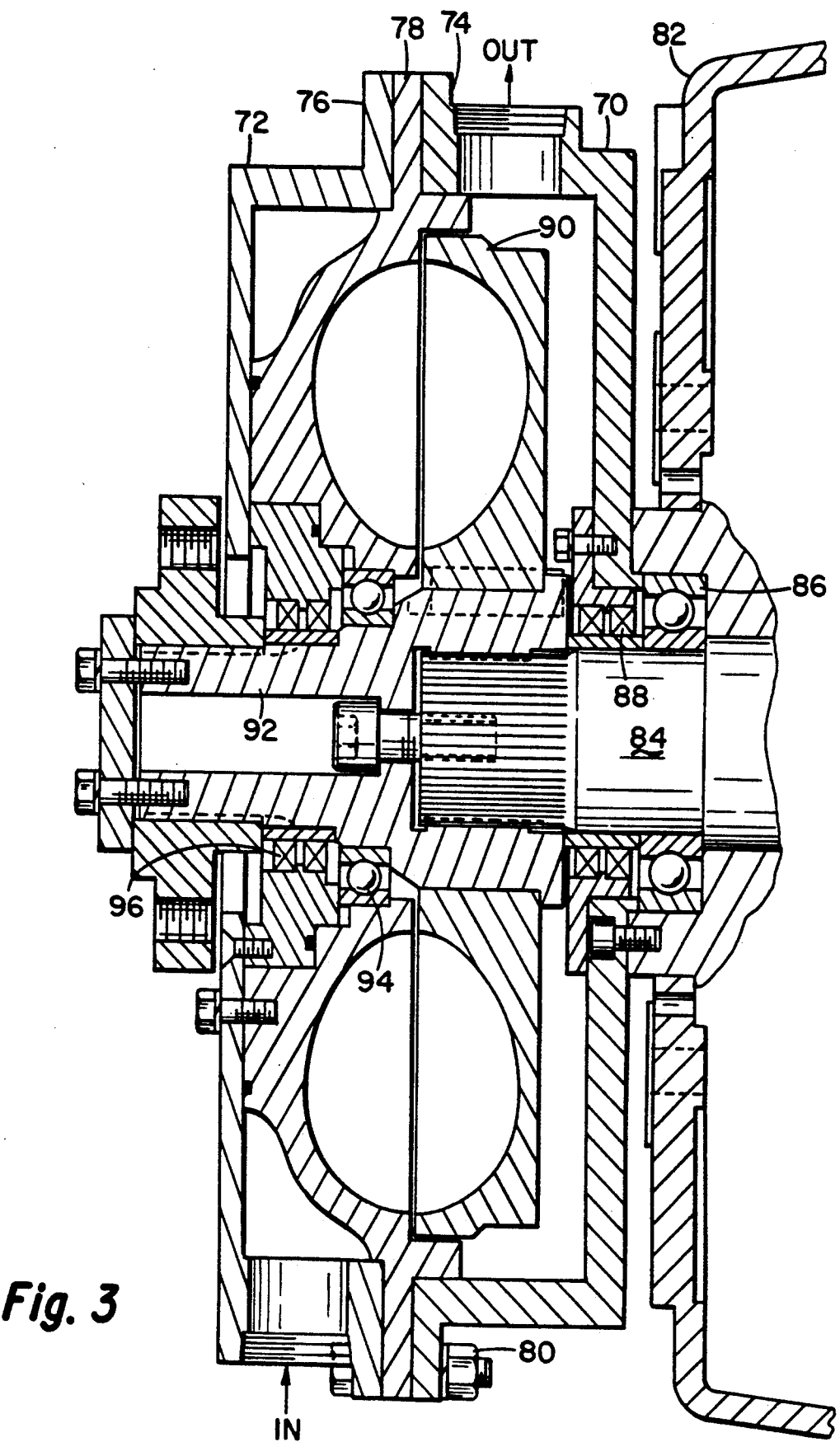
FIG. 3 is an enlarged sectional view of a hydrodynamic retarder interconnected with the main output drive shaft of an electric motor-driven wheel rim and tire assembly.

In FIG. 2A the wheel assembly is depicted having a rotatable rim 20 to which pneumatic tire members 21 and 22 are mounted. Interiorly of the wheel rim and tire assembly is non-rotatable housing 22 that is coaxially positioned therein. Within the non-rotatable housing 22 is an electric motor 24 and an associated transmission means, not described in detail herein, for transferring the output from the electric motor through a transmission, for example, a planetary gear reducing system 26, driven by the output drive shaft 28, shown dotted. A hydrodynamic retarder 30 which is shown in greater detail in FIG. 3 is interconnected with the output drive shaft. The electric motor-driven system shown in FIG. 3 is typical of the type manufactured by General Electric and identified as their Model 787/788 type of motorized wheel.

Figure 2B:
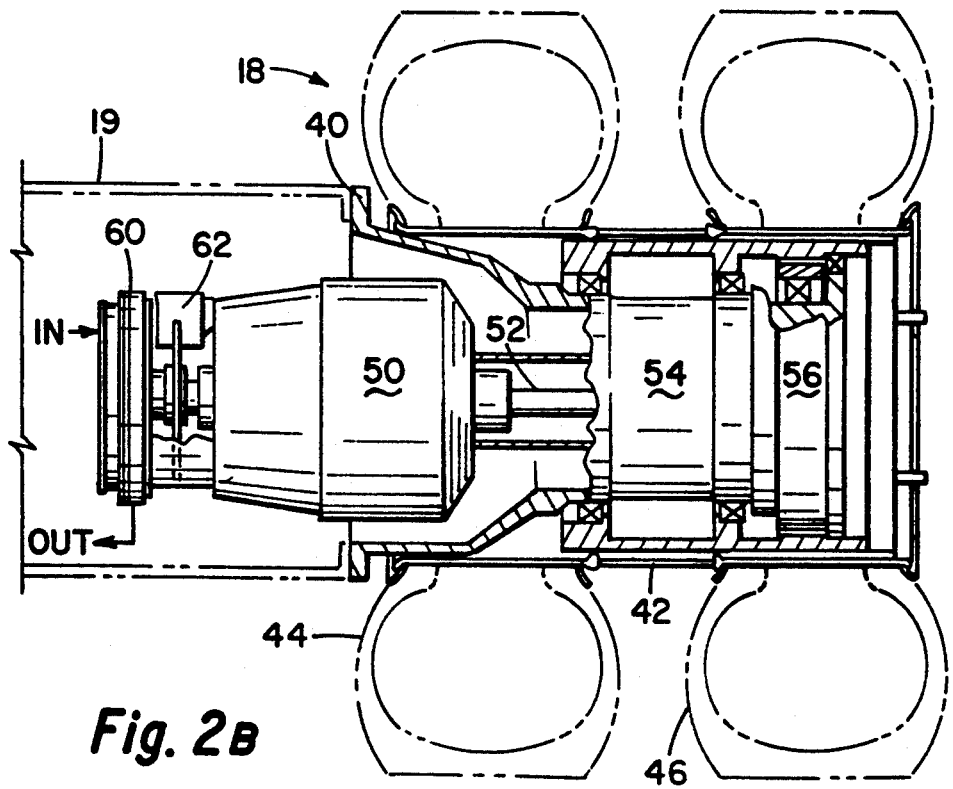

Referring to FIG. 2B, the electric motor-driven wheel is depicted which is of the type manufactured by Reliance Electric under their trademark TIGER TORQUE. In this embodiment the drive axle 19 is affixed to a non-rotatable housing 40 which is coaxially positioned within a rotatable wheel rim 42 and the pneumatic tires 44 and 46 which are mounted thereto. In this embodiment an electric motor 50 is attached to the non-rotatable housing 40 with the output drive shaft 52 being directed at one end of the motor to a transmission or gear-drive system 54 and 56 for transmitting the output drive energy into rotational energy of the wheel rim and tire assembly. At the other end of the electric motor 50 and interconnected with the output drive shaft is a hydrodynamic retarder 60 which may also include a disc brake assembly 62.

Referring now to FIG. 3, a typical hydrodynamic retarder for use in conjunction with the concepts of this invention is depicted. The retarder comprises a housing formed of a first member 70 and a second member 72 retained together at respective flanged portions 76 between which is sandwiched an individual stator 78. The assembly is retained together by a plurality of threaded retainers 80. Such a retarder is similar to that shown in U.S. Pat. 3,860,097. The assembled housing is connected to the non-rotatable housing section 82. Coaxially extending is the electric motor output shaft 84 which is rotatably sealed relative to the hydrodynamic retarder housing 70 and the non-rotatable housing section 82, as shown using bearings 86 and seals 88. The output drive shaft is connected to the rotor 90 which is assembled as a part of sleeve 92 which is supported upon appropriate bearings 94 and seals 96. Through appropriate interconnection with sleeve 92, additional hydrodynamic retarders may be assembled or mounted in series or in parallel as described in the aforesaid U.S. Pat. 3,860,097.

Referring now to FIG. 4, the graph is provided to indicate that as the speed of the motor increases, the torque developed or absorbed decreases after a certain peak and sustaining of torque as shown by the horizontal line 100, that is, the torque increases to 12,000 foot-pounds at about 500 rpm where it says substantially constant until about 1400 rpm when the braking torque rapidly decreases.

FIG. 5 shows the maximum speed the vehicle of a certain weight may attain on a particular grade wherein the electric motors are still able to decelerate the vehicle to a slower speed without using the service or disc brakes. Due to the heavy vehicle weights, most of the service brakes can make only one emergency stop from high speeds and cannot make repeated stops due to their thermal limits. If an operator exceeds the maximum speed on a grade and uses the service brakes to slow the vehicle and continues down the grade, should he exceed the maximum speed again, he has no means of stopping the vehicle since the service brakes are hot and will fade.

FIG. 6 shows normal torque speed/speed relationship for hydrodynamic retarders. It is known in the brake art that the torque normally increases in relation to the square of the speed. This characteristic of hydrodynamic retarders in unison with the decreasing torque with the speed of the motor would provide a constant braking torque throughout the speed range of the vehicle.

FIG. 6 depicts the full brake torque/speed relationship which is the maximum absorbing ability of the brake throughout its speed range. The torque or horsepower can be varied by regulating the amount of fluid flowing through the brake or the amount of fluid contained inside the brake at a point in time. It is also known that the absorbing capacity of a hydrodynamic retarder is in direct relation to the diameter of the fluid pockets and the size and the shape of the pockets. Each size of brake also has a maximum power limit, due to the fluid dynamics and a rotational speed limit due to the physical size. Fortunately, retarding of the vehicle is only required a small fraction of the total operating time but when needed, is at a high rotational speed of the equipment. It is a requirement that the hydrodynamic brake be directly connected to the electric motor output in order to be retarded at all times, with the only requirement that fluid be present in the retarder only during retarding and empty during propulsion to avoid extracting power from the vehicle. Accordingly, appropriate flow regulating devices such as a variable opening valve in the fluid circuit of the retarder that is controllable by the vehicle operator is necessary. In the alternative, a simple on/off flow regulating device controllable by the operator would reduce any possibility of failure in a variable opening valve and thus result in maximum retarding throughout the operating speed range of the vehicle.

The size of the retarder is important to avoid overstressing the motor and transmission or gear-reducing system. Using a small retarder to avoid overstressing the power drive train at mid speed would not provide adequate retarding at maximum speed. This is depicted in FIG. 7. Using a larger retarder to provide adequate retarding, when full, at maximum speed, would provide excessive retardation at midspeed and overstressing the power drive train.

FIG. 8 is a graph of such a device coupled with an electric motor and the resulting braking capacity.

The amount of braking determines the maximum deceleration of the vehicle. If the deceleration is too great, excessive stresses can be imposed upon the vehicle and be most uncomfortable for the operator. If the braking is too small, the operator would be required to anticipate in advance when retarding will be required. Otherwise, the overall time required to decelerate the vehicle, which consists of operator reaction time and braking time, may be too large and result in poor vehicle performance.

Since the electric motors develop a certain maximum braking torque at lower speeds, the addition of a hydrodynamic retarder to obtain the same total braking torque at higher speeds will result in the same vehicle performance at such higher speeds. Accordingly, it is proposed to apply a hydrodynamic retarder of a particular diameter to provide adequate range braking but having a particular pocket size and shape to provide adequate but limited capacity and maximum speed when operating full of fluid throughout the entire speed range of the vehicle. This would provide equal braking performance for the vehicle at all speeds.

FIG. 9 depicts a correctly designed retarder with an electric motor which will provide such constant braking torque throughout the speed range and eliminate the problems previously discussed.

FIG. 10 describes and indicates gross vehicle weight versus vehicle speed for a combination of electric motor and hydrodynamic retarders as shown in FIG. 6. Thus, a 300,000 lb. vehicle can be operated to the maximum speed of 34 mph on a twenty percent (20%) grade and still be capable of deceleration.

Thus, with this invention, there is no substantial loss of braking ability in combining a hydrodynamic retarder with the electric motor-driven wheel rim and tire assembly type of off-road vehicle.

What is claimed:

1. A wheel assembly for large, off-road vehicles comprising:
    a driving wheel rim and tire assembly rotatably attached to a vehicle chassis;
    a non-rotatable housing section attached to said chassis and co-axially positioned contiguously to said assembly;
    an electric motor mounted in said non-rotatable housing having a rotor driven output shaft connected to a transmission means to drivingly drivenly rotate said wheel rim and tire assembly;
    a hydrodynamic stator/rotor type retarder, said retarder comprising:
    a hydrodynamic housing co-axially connected to said non-rotatable housing, a hydrodynamic stator affixed within said hydrodynamic housing, a hydrodynamic rotor rotatably supported contiguously to said stator, and means to controllably supply fluid to said retarder;
    means to directly connect said electric motor rotor driven shaft to said hydrodynamic rotor; and
    means to controllably retard rotational speed of said wheel rim and tire assembly by said electric motor and/or said retarder.

2. The assembly of claim 1 wherein said means to controllably retard said rotational speed of said wheel rim and tire assembly occurs by said electric motor at a lower range of speeds and by said retarder at a range of speeds higher than said lower range.

3. The assembly of claim 2 wherein said lower range of speed is from 0 to about 1300 rpm and said higher range of speed is from 1300 to 3200 rpm.

* * * * *

UNITED STATES PATENT AND TRADEMARK OFFICE
CERTIFICATE OF CORRECTION

PATENT NO. : 5,289,905
DATED : March 1, 1994
INVENTOR(S) : Steve A. Braschler

It is certified that error appears in the above-indentified patent and that said Letters Patent is hereby corrected as shown below:

Column 4, line 48, "says" should be --stays--

Signed and Sealed this

Sixteenth Day of August, 1994

Attest:

BRUCE LEHMAN

Attesting Officer     Commissioner of Patents and Trademarks